United States Patent [19]
Blanck et al.

[11] Patent Number: 5,257,353
[45] Date of Patent: * Oct. 26, 1993

[54] I/O CONTROL SYSTEM HAVING A PLURALITY OF ACCESS ENABLING BITS FOR CONTROLLING ACCESS TO SELECTIVE PARTS OF AN I/O DEVICE

[75] Inventors: Greg J. Blanck, Santa Clara; Rakesh K. Agarwal, Palo Alto, both of Calif.

[73] Assignee: Intel Corporation, Santa Clara, Calif.

[ * ] Notice: The portion of the term of this patent subsequent to Sep. 8, 2009 has been disclaimed.

[21] Appl. No.: 892,149

[22] Filed: Jun. 2, 1992

Related U.S. Application Data

[63] Continuation of Ser. No. 722,395, Jun. 19, 1991, Pat. No. 5,146,565, which is a continuation of Ser. No. 469,755, Jan. 3, 1990, abandoned, which is a continuation of Ser. No. 886,918, Jul. 18, 1986, abandoned.

[51] Int. Cl.$^5$ .................. G06F 13/20; G06F 13/00
[52] U.S. Cl. .................................. 395/275; 395/800; 364/241.9; 364/284.2; 364/DIG. 1; 364/927.95

[58] Field of Search ........................ 395/275, 800

[56] References Cited

U.S. PATENT DOCUMENTS

| | | | |
|---|---|---|---|
| 4,414,626 | 11/1983 | Arai et al. | 395/275 |
| 4,695,945 | 9/1987 | Irwin | 395/275 |
| 4,849,931 | 7/1989 | Ishii et al. | 395/275 |
| 4,901,274 | 2/1990 | Maejima et al. | 395/275 |

*Primary Examiner*—Thomas C. Lee
*Assistant Examiner*—Paul Harrity
*Attorney, Agent, or Firm*—Blakely, Sokoloff, Taylor & Zafman

[57] ABSTRACT

In an I/O port protection device, is described wherein accessing an I/O device is selectively controlled by a value of a bit stored in a bit map. A CPU instruction accessing a port is allowed direct access when the bit value for that port is a zero, but is trapped when the value is a one. A trapped instruction is either prohibited from any accessing or is rerouted for accessing a different I/O port.

10 Claims, 3 Drawing Sheets

TASK A
BIT0 BIT1 RESULT
 0  +  0  =  0

TASK B
BIT4 BIT5 BIT6 BIT7 RESULT
 1  +  1  +  1  +  1  =  1

I/O CONTROL SYSTEM HAVING A PLURALITY OF ACCESS ENABLING BITS FOR CONTROLLING ACCESS TO SELECTIVE PARTS OF AN I/O DEVICE

This is a continuation of application Ser. No. 07/722,395, filed Jun. 19, 1991 now U.S. Pat. No. 5,146,565, which is a continuation of application Ser. No. 07/469,755, filed Jan. 3, 1990 now abandoned which is a continuation of application Ser. No. 06/886,918, filed Jul. 18, 1986 now abandoned.

BACKGROUND OF THE INVENTION

1. Field of the Invention

The present invention relates to the field of controlling data transfer between a data source and peripheral devices. More specifically, the present invention relates to a technique of protecting certain accesses to an input-/output device of a computer.

2. Prior Art

In a typical multiple-user computer system, a number of users or a single user executing several tasks in parallel communicate with the computer's central processing unit (CPU). This CPU, in performing certain instruction steps, will communicate with input/output (I/O) devices, such as printers, disks and other peripherals. In order to allow the transfer of data to and from these various units, the CPU must promulgate instructions which control the accessing of these various units.

It is well-known in the computer industry that many schemes exist to control the accessing of an I/O device. One such I/O controlling device is a data synchronizer described in U.S. Pat. No. 3,812,475, wherein data channels direct the flow of information between I/O devices and main storage so that the CPU is relieved of communicating directly with the devices and permit data processing to proceed concurrently with I/O operations. Further, in a multiple user environment, user security systems have been implemented to prevent one user from interfering or disrupting other users. For example, a memory device such as a disk, is separated into a number of work areas and a particular user is allowed to access that user's work area only and alternatively is also protected from entry by other users. However, such I/O controlling and multiple user-protection systems have been developed primarily with the large mainframe computers of the past, and are not readily applicable to the microprocessor based so-called "personal computers" (PCs) of today, wherein the limited size of the PCs require the CPU to direct all controlling functions.

The first generation PCs originated as a single-user computer system, wherein a single user had full operational control of the complete system, including all I/Os connected to the PC. Many programs, both operating systems and applications software, have been written for the PC, allowing full control and access by the single user. However, as PCs became more prevalent, its use has recently been expanded into commercial domains beyond the single-user environment. Although multiple-user PCs exist today, none provide the extensive user protection devices available to the larger mainframes. The few PCs with multiple-user capability operate as a time-sharing machine having one full user and many limited users. The prior art multiple-user PCs cannot operate with every user utilizing the single-user software routines unless some means is used to control the full system accessing capabilities of these popular software routines.

It is appreciated that what is needed then is a multiple-user microprocessor based computer, compatible to operate many of the existing popular PC software routines. Such a computer should be patterned to fit into the existing PC environment. Ideally, what is needed is a multiple-user PC which provides a perspective to every user that the PC is a single-user machine capable of running most single-user software routines. The multiple-user PC, having a microprocessor as a CPU, must be capable of controlling the rerouting of certain user routines so that one user will not interfere with routines of other users. Where a plurality of single-user routines are running simultaneously, some means must be used to control the I/O accessing of these routines. Because of the limited scope of the CPU, the controlling and protection scheme of the mainframes cannot be readily adapted to the PC environment. A more primitive but effective means for I/O accessing is then needed. The present invention provides such I/O protection.

SUMMARY OF THE INVENTION

The present invention describes an apparatus for selectively controlling the accessing of an I/O device. A CPU instruction controls the accessing of a plurality of I/O ports for transferring data to and from the I/O devices. A first storage means stores I/O access enabling bits such that each port has a corresponding access enabling bit. When an I/O accessing instruction is generated, the enabling bit(s) for the port(s) to be accessed is (are) consulted. If a zero value is present, direct access is allowed, but if a one value is present, a trap occurs preventing direct access. The trap will either prohibit any access or modify the instruction for accessing another I/O port. Direct access trapping and re-routing provides for the I/O device to be virtualized.

The present invention discloses an apparatus for protecting the accessing of an I/O device coupled to a microprocessor based CPU having a multiple-user protection capability. Although the term multiple-user is used, it refers to a plurality of persons executing individual tasks, as well as to a single user executing several independent tasks in parallel, or the combination of the above. Multiple user is used, because the computer views any substantially simultaneous parallel input as a plurality of user routines. In the following description, numerous specific details are set forth such as the use of a specific bit pattern in order to provide a thorough understanding of the present invention. However, it will be apparent to one skilled in the art that the present invention may be practiced without these specific details. In other instances, well-known devices have not been described in detail in order not to unnecessarily obscure the present invention.

Figure 1:
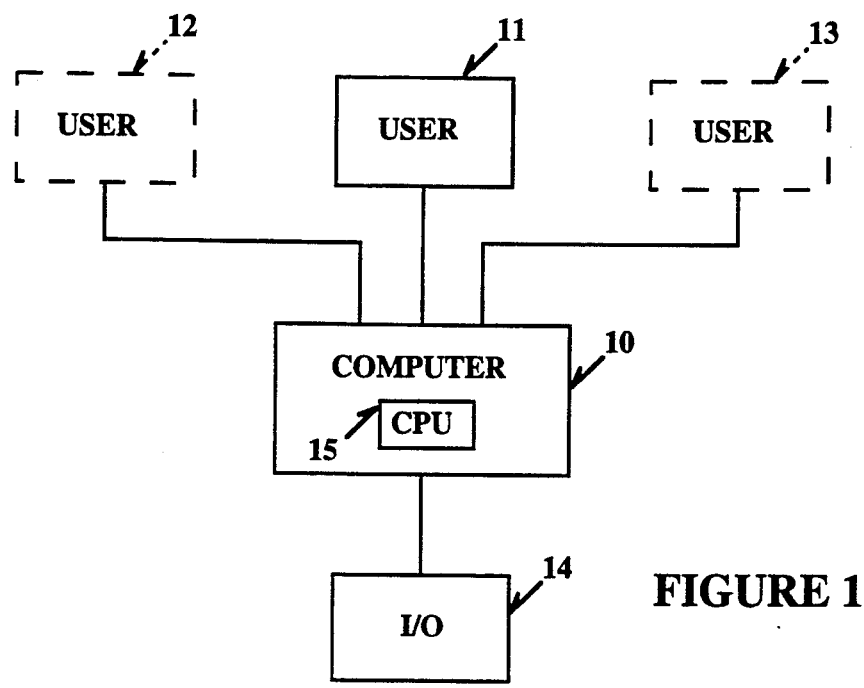
FIG. 1 is a block diagram of a typical microprocessor based computer system.

In FIG. 1, a block diagram of a typical microprocessor based computer system, such as a PC or a desktop computer is shown. A computer 10 including a microprocessor based CPU 15 is at the command direction of a user 11. The computer 10 is also coupled to an I/O device 14 which may be of any commercially available I/O device such as a printer, disk drive, etc. Although only one I/O device is shown for simplicity, many such I/O devices may be coupled to the computer 10. In a single-user system, as shown by user 11 only, the complete accessing of I/O device 14 by user 11 is equivalent to a prior art system. Therefore, with single user 11, computer 10 may process programs using prior art single-user methods.

However, when additional users, shown by users 12 and 13, are coupled to the computer 10 some means of I/O 14 protection must be implemented to prevent all users 11-13 from having the capability of accessing the full range of I/O 14. Typical prior art PC multiple-user systems entailed one supervisory user having full I/O accessing capability and others (subordinate) users having limited use capabilities in which the supervisory user established the limitation of the subordinate users. In no manner could all users operate one of the commercially available single-user programs without interfering with each other in accessing an I/O device. The computer 10 of the present invention permits all users 11-13 to operate a typical prior art single-user program, yet channelling the CPU 15 instructions to prevent any interference of I/O accessing by all of the users.

Figure 2:
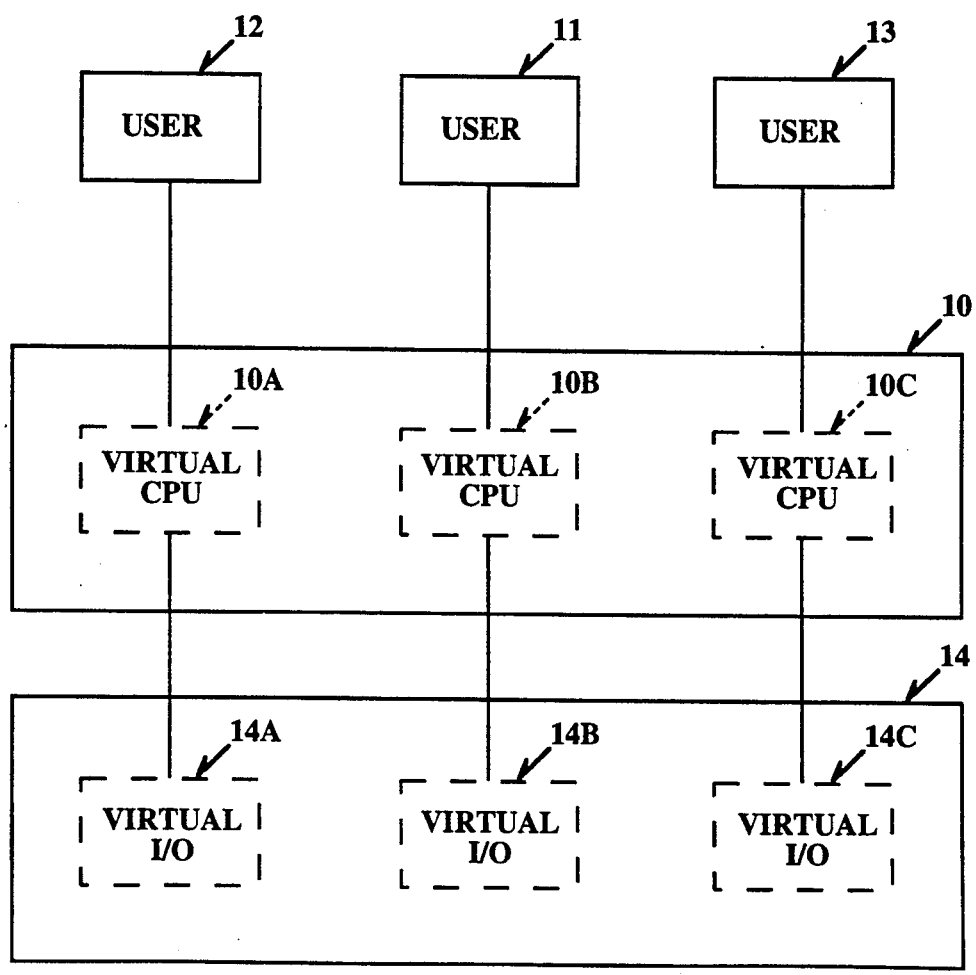
FIG. 2 is an expanded block diagram of the computer system of FIG. 1 showing a virtual machine and a virtual I/O.

FIG. 2 is an expansion of the system shown in FIG. 1 from the perspective of the user. Same users 11-13 operate computer 10 which is coupled to I/O 14. The computer 10 of the present invention operates as a virtual machine such that each user appears to be in full control of computer 10. Therefore, users 11-13 are virtualized to virtual machines 10a-10c, respectively, which appears as computer 10 to each user 11-13. The concept of virtual machines is not new and is well-known in the computer industry, however, virtualizing an I/O operations of a microprocessor based PC involves a different set of problems.

The apparatus of the present invention also uses the concept of virtualizing I/Os. Virtual I/Os are also not novel, however, such virtualizing of I/Os has heretofore never been attempted in a simplified architecture such as that of a PC. In FIG. 2, each user 11-13, not only appears to be in full control of a computer, but also appears to fully control I/O 14. Virtual I/Os 14a-14c causes an appearance that each user 11-13 is in full control of I/O 14. However, that full I/O control must be in appearance only and some means must physically prevent I/O access interaction by users 11-13. Although only these users 11-13 are shown for simplicity, many more may access computer 10.

Figure 3:
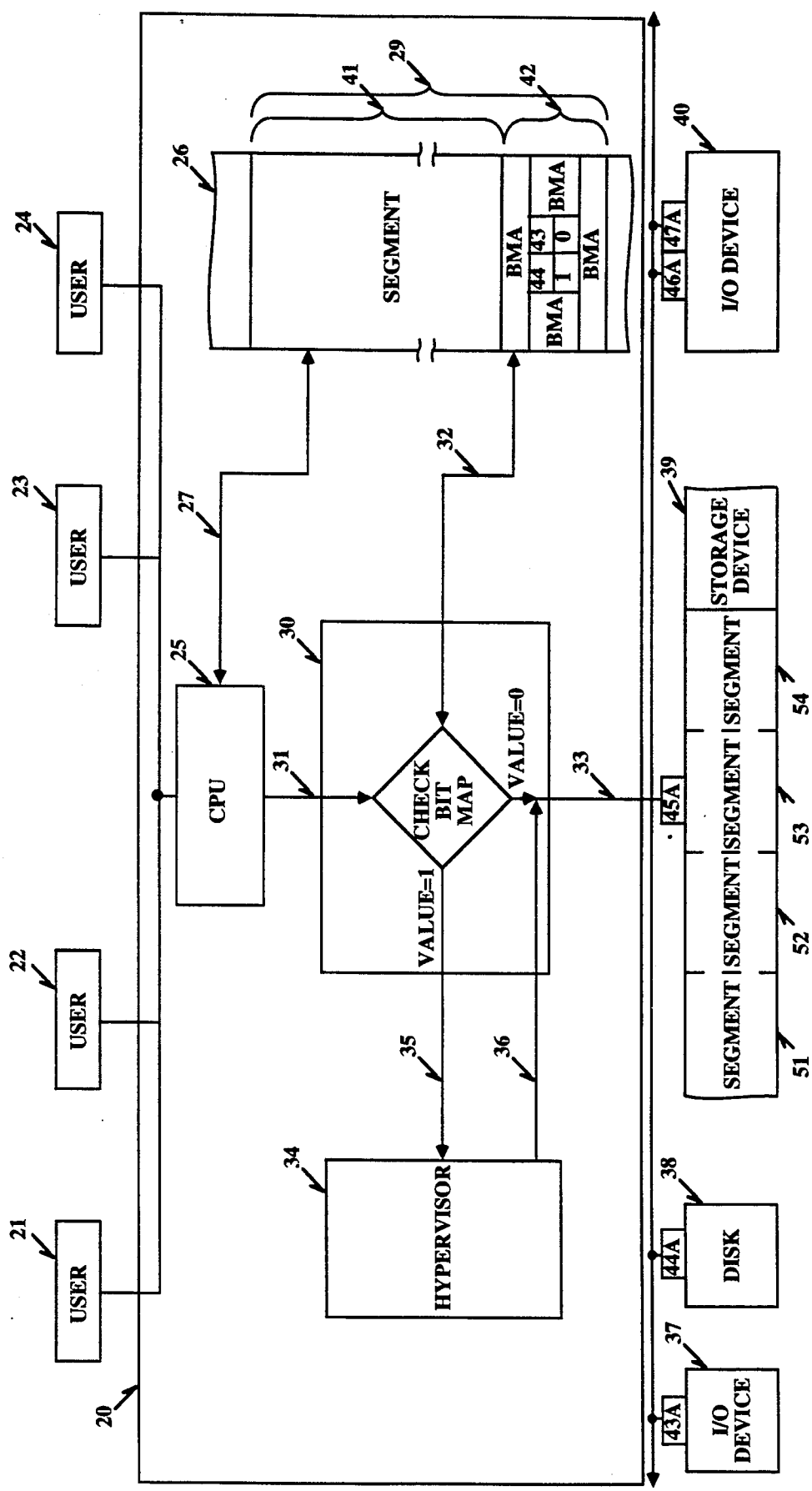
FIG. 3 is a block diagram of a computer system showing the function of the port protection circuit.

Referring to FIG. 3, a computer 20 including the apparatus of the present invention is shown coupled to users 21-24. Although only four users are shown, any number may use the machine. The computer 20 includes a microprocessor based CPU 25. CPU 25 operates as a virtual machine, presenting an appearance that each user 21-24 has complete control of computer 20. The CPU 25 is coupled to a memory device 26 by line 27. Memory 26 is usually an internal memory, such as a ROM or a RAM, however, memory 26 need not be constrained as an internal memory.

The CPU 25 is also coupled to I/O protection circuit by line 31. Circuit 30 is also coupled to memory 26 on line 32 and to various I/Os on line 33. A hypervisor 34 which contains a set of programmed instructions is also coupled to circuit 30 by lines 35 and 36. I/O line 33 couples various I/O devices 37-40 to computer 20. Any number of I/O devices may be coupled to line 33. Further, other control lines which are not pertinent to understanding the present invention are not shown.

Structurally, memory 26 of the preferred embodiment allocates a certain region 29 of memory for each particular user. An operating system program of the computer 20 controls such partitioning of memory 26 and any prior art memory scheme may be used including virtual memories. Each region 29 is further divided into two or more areas 41 and 42. Area 41, which includes other programming instructions for the CPU 25, is coupled to CPU 25 by line 27. Bit map area (BMA) 42 contains a grouping of bits for determining I/O accessing and contains the coding for implementing the I/O protection scheme of the present invention. BMA 42 is coupled to circuit 30 by line 32.

Functionally, as CPU 25 executes each instruction step of a particular user, CPU 25 transitions through instructions stored in segment 41. Whenever an instruction in area 41 requires an accessing of an I/O device, BMA 42 is consulted. BMA 42 contains a bit map in which a bit is allocated to each I/O port. Hence, an I/O device having a plurality of ports will have a plurality of bits assigned to that I/O device.

As I/O access instruction is transmitted from CPU 25 on line 31 to circuit 30, circuit 30 also looks at the bit state of the I/O port being accessed by CPU 25. Whenever a bit has a value of "0", the CPU 25 is allowed direct access on line 33 to that corresponding port represented by the bit. For example, in FIG. 3, bit 43 of BMA 42 will allow CPU 25 to access port 43A of device 37, because the value of bit 43 is 0.

Whenever a bit in BMA 42 has a value of "1", direct access of an I/O port by CPU 25 is prevented by circuit 30. In this instance, circuit 30 provides a trap having two options. One option is for circuit 30 to prevent any accessing to that I/O port. The other option is for circuit 30 to virtualize the I/O port.

If I/O virtualization is desired, circuit 30 traps and reroutes the CPU 25 instruction on line 35 to hypervisor 34. Hypervisor 34 contains a programmable set of instructions for virtualizing an I/O port and the revised instruction is transmitted on line 36. Hypervisor 34 may be any internal or external memory storing device storing a set of instructions which may be programmed by the system designer. Hypervisor 34, shown as part of computer 20, may be an external memory device as well. The crucial aspect of the hypervisor 34 is its ability to virtualize I/O ports whenever access enabling bit has a value of 1. Further, although the preferred embodiment describes a value of 0 or 1 for controlling I/O access, it is appreciated that any value may correspond to such accessing control.

Assuming that users 21-24 are all executing similar single-user programs in which they all attempt to access the same device 38 (a disk drive in this instance) having a single port 44a controlled by bit 44, the system designer will have programmed bit 44 to have a value of 1 for three of the users, 22-24 (a bit map for only one user is shown in the drawing) and a value of 0 for user 21 (a bit map for user 21 is not shown.) As segment 41 instructions are executed for each user, port 44a access is attempted by all four users 21-24. However, because only user 21 has an enabling bit value of 0 for bit 44, only user 21 will be allowed direct access to port 44A. Users 22-24, having enabling bit value of 1 for their respective bit 44, will have their CPU 25 instruction rerouted to hypervisor 34. Hypervisor 34 will then redirect the instruction to another device, such as storage device 39, wherein users 22-24 will be allocated areas 51, 52 and 53, respectively. Thus, by virtualizing the I/O, users 22-24 appear to control device 38 but in actuality are relegated to regions in larger device 39. Further, if user 21 is to have his or her access virtualized also, such as to area 54, then user 21's bit 44 will be set to 1 and rerouted to the hypervisor 34.

Circuit 30 may control a multiple port device such as device 40. Segment 41 instruction will attempt to exercise a multiple port access instruction and circuit 30 will look to a plurality of enabling bits in BMA 42 corresponding to the port's access. Again, any "1" value will cause a trap and rerouting of the instruction to the hypervisor 34. Hypervisor 34 will then reroute the accessing to another multiple port device or possibly even to a single port device, by methods well-known in the prior art.

Figure 4:
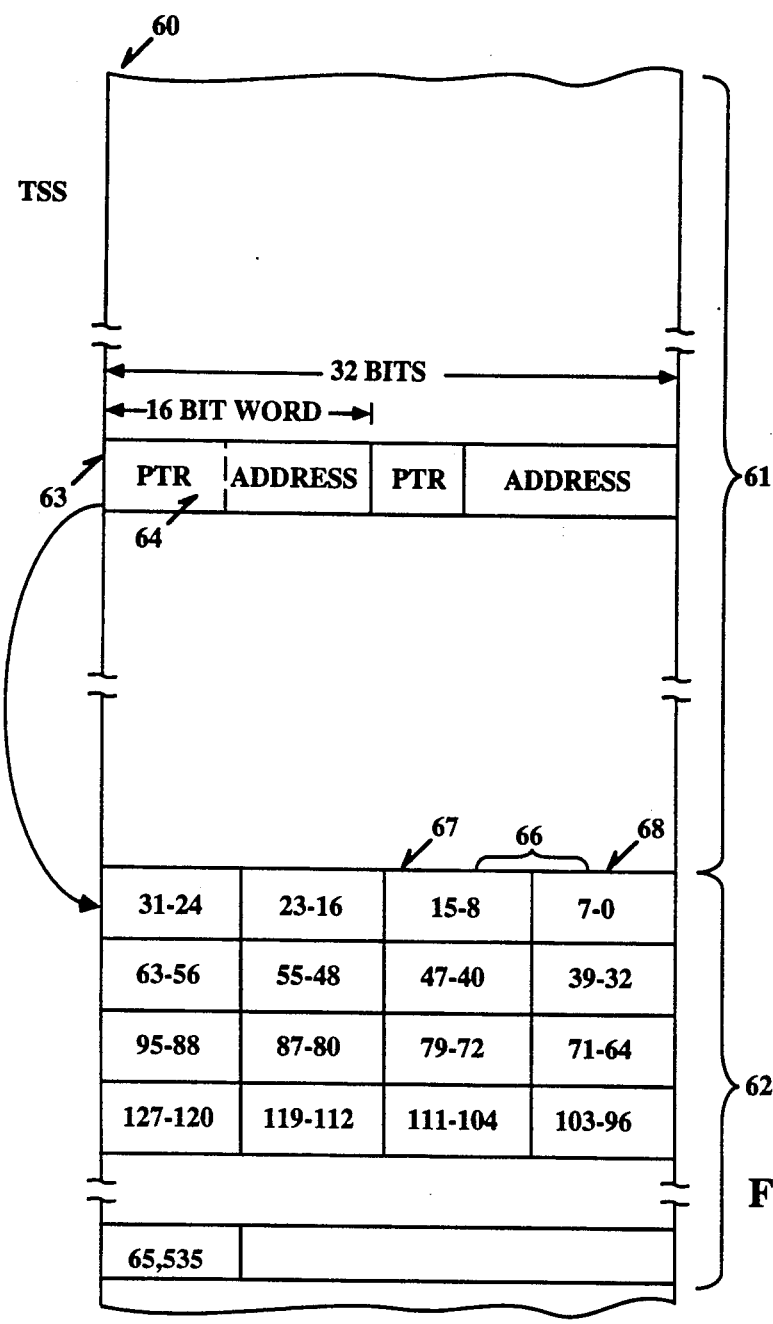
FIG. 4 is a diagram showing the task state segment and bit map segment of the memory.

FIG. 4 better shows the layout of the memory 26 of FIG. 3 as used in the preferred embodiment. A memory 60 includes an area 61 for storing of CPU instructions and BMA 62. Each word in memory 60 is a 16-bit word, although any word length may be used. Each word in BMA 62 is further partitioned into two bytes 67 wherein each byte 67 is eight bits long. Because each bit represents access control of an I/O port, each byte 67 will control accessing to eight different I/O ports. The preferred embodiment allocates up to 64K bits (or 8K bytes) of memory to each BMA 62 allowing for a possible access of 65,535 ports. Because 64K I/O ports is a highly unlikely situation to exist, memory space will be conserved by having a default condition of 1 for unspecified ports. Hence, for example, BMA 62 could have memory space for 96 bits (0-95) for ports 0-95 and any ports having an address larger than 95 is given a default value of 1 and any instruction accessing such ports are rerouted through the hypervisor without consulting the bit map in BMA 62.

To access the proper access control bits the I/O access word 63 is comprised of a pointer 64. The pointer 64 contains the address of the bit map address 66 corresponding to the bit(s) representing the I/O port(s) accessing by word 63 for a specific task by the CPU. Thus, 1, 2, or 4 bits of word 66 may be compared allowing for access control of 1, 2 or 4 contiguous I/O ports for each I/O instruction.

Referring to FIG. 3, in actual practice, circuit 30 is a programmable logic array (PLA), including controlling software, which is part of the CPU 25. In an alternate embodiment, circuit 30 has been implemented on a semiconductor chip, wherein the chip also includes a storage device, such as a RAM or a ROM, for storage of controlling software. Further, it is appreciated that BMA 42 (and 62 of FIG. 4) may also be included within circuit 30. It is also appreciated that circuit 30 and hypervisor 34 may be implemented in microcode also. Lines 27 and 32 are in reality the same lines representing a data bus. Lines 35 and 36 are also the same lines and transfer data between the CPU 25 and hypervisor 34. Actually, lines 27, 32, 33, 35 and 36 may even be the same lines representing data lines to and from CPU 25.

Figure 5:
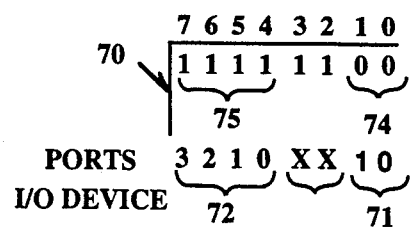
FIG. 5 is a bit pattern diagram showing the comparison operation of the port protection circuit.

Referring to FIGS. 4 and 5, the advantage of using a pointer 64 of FIG. 4 is illustrated in FIG. 5. In FIG. 5, a hypothetical situation is shown as an example, wherein a bit pattern 70 for bits 0-7 is shown. Pointer 64 of word 63 selects the first two bits (bits 0 and 1) of word 66. In this example, only two bits are selected, although 1, 2, or 4 bits of word 66 may be selected. Further, pointer 64 may be of any length depending on the architecture of the system. In the example of FIG. 5, bits 0 and 1 control access of I/O ports 0 and 1 of device 71. Bits 2 and 3 are not attached to any device and bits 4-7 control access to ports 0-3 of device 72 (devices 71-72 are physically not shown). Whenever a bit pattern is selected by pointer 63, the whole bit pattern 70 (1, 2 or 4 bits) is compared for I/O access. The bits combined in an OR operation to determine device access. In task A, bit pattern 74 is selected for a dual-port device 71. The bits of bit pattern 74 are ORed to determine if any "1" value is present. All of the bits have a value of 0 in this instance allowing accessing of ports 0 and 1 of device 71 by this particular user. In task B, the user attempts to access ports 0-3 of device 72. The bits of bit pattern 75 are ORed to determine if any "1" value is present. The presence of any "1" value (all bits in this instance) causes a trap and prevents any direct accessing of the I/O. Note that a "1" value would have resulted if any of the four bits in pattern 75 was a "1".

Because every port must be protected from multiple port transfers, the enabling bit for every port being used in a transaction must be valid for any part of the transaction to be allowed. Thus, in FIG. 5, the checking of the bit values of the ORed result provides such protection. Therefore, by comparing a number of bits, multiple port protection is achieved for a device. Also not that bits 2 and 3 of pattern 70 have a default value of "1" because no devices are coupled to bits 2 and 3 for controlling access. The coding of pointer 64 may be accomplished in singular or multiple bit format. By selecting an appropriate bit pattern for each bit map, some I/Os are allowed rapid, direct access by a particular user while other I/Os are trapped and virtualized.

Although the preferred embodiment describes an I/O port protection apparatus in reference to a user accessing a particular I/O, it should be noted that any device, including another I/O, may be substituted in place of the user. The focus of the invention resides in the ability of the apparatus to selectively allow certain instructions to directly access the I/O while other instructions are trapped. Further, although the preferred embodiment selects 1, 2 or 4 bits for I/O port protection, any number of bits may be used without departing from the spirit and scope of the invention.

Thus, an apparatus to provide I/O protection and virtualize the protected I/O is described.

We claim:

1. A method of operating a digital computer apparatus, wherein said digital computer apparatus performs a plurality of substantially simultaneous tasks, and wherein said digital computer apparatus has a plurality of I/O ports for accessing a plurality of I/O devices and stores for each of said tasks an I/O bit map, where each I/O map contains a plurality of I/O access enabling bits corresponding to at least some of said plurality of I/O ports, said method comprising the steps of:

executing an I/O request instruction for accessing a selected one of said I/O devices via a selected one of said I/O ports, said executing step performed by one of said tasks;

accessing one of said I/O bit maps, said one of said I/O bit maps corresponding to said one of said tasks, to determine the content of a plurality of I/O access enabling bits for said selected one of said I/O devices in said one of said I/O bit maps, wherein each of said I/O access enabling bits is assigned to a corresponding one of said plurality of I/O ports;

permitting access of said selected one of said I/O devices by said one of said tasks if said content of any said plurality of I/O access enabling bits is of a first value; and prohibiting access of said selected one of said I/O devices by said one of said tasks if said content of all said plurality of I/O access enabling bits is of a second value.

2. The method according to claim 1 wherein said step of accessing includes sending a memory request to an external memory, said I/O bit maps residing in said external memory.

3. The method according to claim 1 further including the step of storing in an external memory each said I/O bit map.

4. The method according to claim 1 further including the steps of storing said I/O bit maps in an external memory and recalling I/O bit map data from said external memory.

5. The method according to claim 1 wherein said first value is zero and said second value is one.

6. The method according to claim 1 further including the step of storing in an external memory each said I/O bit map, and wherein said step of accessing includes sending a memory request to said external memory.

7. Digital computer apparatus, the computer apparatus executing instructions for performing a plurality of substantially simultaneous tasks, comprising:

a plurality of I/O ports for accessing a plurality of I/O devices;

a memory access port by which said apparatus stores for each of said tasks an I/O bit map in an external memory, where each I/O bit map contains a plurality of I/O access enabling bits corresponding to said plurality of I/O ports;

an execution unit for receiving by one of said tasks an I/O request instruction for accessing a selected one of said I/O devices via a selected one of said I/O ports, said execution unit coupled to said plurality of I/O ports and said memory access port;

an access control responsive to said I/O request instruction to access one of said I/O bit maps, said one of said I/O bit maps corresponding to said one of said tasks, to determine the content of a plurality of I/O access enabling bits for said selected one of said I/O devices in said one of said I/O bit maps, wherein each of said I/O access enabling bits is assigned to a corresponding one of said plurality of I/O ports, said access control coupled to said plurality of I/O ports, said memory access port, and said execution unit;

said access control permitting access of said selected one of said I/O devices by said one of said tasks if said content of any said plurality of I/O access enabling bits is of a first value;

said access control prohibiting access of said selected one of said I/O devices by said one of said tasks if said content of all said plurality of I/O access enabling bits is of a second value.

8. The apparatus according to claim 7 external memory wherein said coupled to said memory access port.

9. Apparatus according to claim 8 wherein each of said I/O bit maps is stored in said external memory.

10. The apparatus according to claim 7 wherein said computer apparatus is constructed as a single-chip microprocessor.

* * * * *

UNITED STATES PATENT AND TRADEMARK OFFICE
CERTIFICATE OF CORRECTION

PATENT NO. : 5,257,353
DATED : Oct. 26, 1993
INVENTOR(S) : Greg J. Blanck, et al It is certified that error appears in the above-indentified patent and that said Letters Patent is hereby corrected as shown below:

Abstract, item

[57] Delete "is described wherein"

Column 8 Lines 30 and 31: Delete "external memory wherein said coupled"     Insert in place thereof --wherein said external memory is coupled--

Signed and Sealed this

Nineteenth Day of September, 1995

*Attest:*

BRUCE LEHMAN

*Attesting Officer*        *Commissioner of Patents and Trademarks*